May 28, 1935.　　　M. KLEIN　　　2,002,950
PRESSURE GAUGE
Filed Sept. 27, 1932
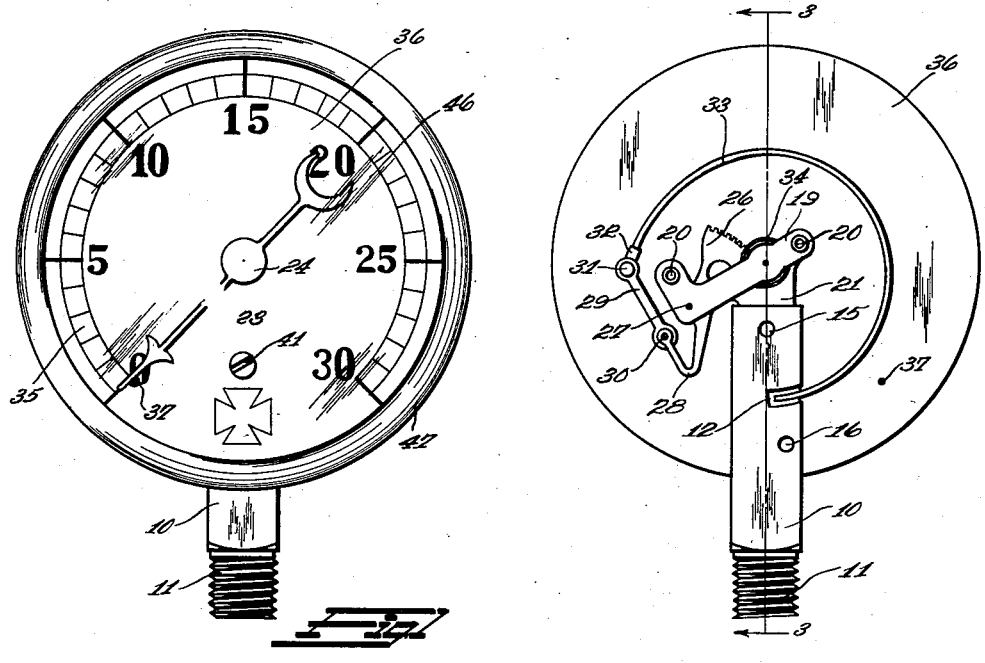
Inventor
Maximilian Klein
By
Strauch & Hoffman
Attorneys Patented May 28, 1935

2,002,950

UNITED STATES PATENT OFFICE 2,002,950

PRESSURE GAUGE

Maximilian Klein, Sellersville, Pa., assignor to United States Gauge Company, Sellersville, Pa., a corporation of Pennsylvania Application September 27, 1932, Serial No. 635,103

6 Claims. (Cl. 73—109)

This invention relates to pressure gauges, particularly of the Bourdon type, and aims to provide a gauge construction of great simplicity, manufactured of parts that may be produced at a low cost, and assembled with great facility in such a way as to provide a firm support for all of the parts that enter into its construction.

Another object of the invention is to provide a gauge construction in which the socket member, that serves to connect the gauge to the system in which it is intended to give an indication of the existing pressure, is formed of bar stock that is initially rectangular in cross section and that is brought into the form desired by simple machining operations, the flat surfaces of the bar stock being utilized to provide stable supports for the various parts assembled about said socket member, thus facilitating the assembly of the gauge and contributing to the rigidity of the assembled construction.

A further object of the invention is to provide a simplified way of assembling the socket that carries the moving parts of the gauge with respect to the socket member, and of securing the dial of the gauge to the socket member independently of the bracket just referred to.

Still another object of the invention is to provide a pressure gauge that includes a socket member formed to present a pair of parallel flat suffaces, one of which is utilized to receive a part of the bracket, supporting the moving parts of the gauge, and the other of which is utilized to attach the back of the casing that houses said moving parts of the instrument.

A still further object of the invention is to provide a pressure gauge in which the dial and a part of the bracket that supports the moving parts of the instrument are arranged in juxtaposition and secured to the same side of the socket member of the gauge, but in which the securing of the dial is accomplished in a manner independently of the bracket so that the dial and bracket may be separately attached to the socket member.

This invention also aims to provide a simplified way of assembling the dial and bracket supporting the moving parts of the gauge with respect to the socket member thereof, by utilizing a bushing to secure the bracket to the socket and by then securing the dial to the bushing by fastening means that is engaged therewith.

Still another object of the invention is to provide a gauge in which the dial is spaced from the bracket that supports the moving parts of the instrument and thus maintained free of contact with the said parts, by the means that secures the bracket to the socket member, and in which the dial is then secured to the means that serves the function of spacing the dial from the bracket and securing the bracket to the socket member.

Still further objects of the invention will appear as a description thereof proceeds with reference to the accompanying drawing, in which Figure 1 is a front elevational view of a gauge constructed in accordance with the present invention.

Figure 2 is a rear view of the socket member, the bracket that supports the moving parts of the instrument, and the dial as seen from the rear of the dial.

Figure 3 is a vertical sectional view taken on the plane indicated by the line 3—3 of Figure 2.

Figure 4 is a side elevational view of the socket member.

Figure 5 is a sectional view taken on the plane indicated by the line 5—5 in Figure 4, looking in the direction of the arrows.

Like reference characters indicate like parts throughout the several figures.

The gauge of the present invention is constructed about a socket member 10, which, as indicated in Figure 5 of the drawings, is formed of bar stock of rectangular, preferably square cross-section, said stock being used because a socket member can be readily formed therefrom by ordinary machining operations. In order to accomplish this the bar stock is cut to the desired length and one end thereof is provided with threads 11, permitting the socket member to be screwed into engagement with an internally threaded socket formed as a part of the system or apparatus in which the gauge is to be applied.

A kerf 12 is formed in the socket member on one of the flat sides thereof, said kerf being provided to receive the end of the Bourdon tube of the gauge in a manner hereinafter described. The socket member is further provided with a further groove 13 formed from the end of the socket member, opposite to that which is threaded, such being provided to furnish clearance for the moving parts of the gauge. The socket member is further provided with a bore 14 extending centrally longitudinally thereof to kerf 12 before referred to, such bore serving to put the Bourdon tube in communication with the fluid, the pressure of which is to be measured. Said socket member is further provided with tapped openings 15 and 16, formed from one of the flat sides thereof, such openings being provided for the reception of fasteners, provided to secure the casing to the socket member in a manner hereinafter described. The socket member is further provided with an opening 17 formed from the side thereof opposite to that from which the openings 15 and 16 are formed, said opening 17 being provided to receive the means that fastens the bracket that supports the moving part of the gauge to the socket member. It will be readily understood that the socket member so far described may be conveniently and cheaply produced from bar stock by performing simple machining operations upon stock cut to the desired lengths. All of the parts of the gauge are secured to said socket member.

The moving parts of the gauge are secured in a bracket consisting of a pair of L-shaped bars 18 and 19 that are secured together in spaced relation, as by means of hollow rivets 20 or the like, that pass through sleeves that space the members 18 and 19 apart, or in any other approved manner. The part 18 of the bracket is provided with a downwardly extending part 21 constituting a part of the bracket that, when the gauge is in assembled condition, rests against a flat side of the socket member 10 in lapped relation to said side as illustrated in Figure 3.

An arbor 22, having reduced portions journalled in the bars 18 and 19, extends beyond the bar 18 and carries a pointer 23 that is secured in any approved manner to a hub 24 that is fixed on the arbor. A gear 25 is secured to the arbor between the bars 18 and 19, said gear meshing with a sector gear 26 secured to an arbor having reduced ends 27 journalled in the bars 18 and 19. The sector gear is provided with a U-shaped arm 28 that is pivotally connected to a link 29 by means of a pin 30 as illustrated in Figure 2. The link 29 is connected by means of a pin 21 to an eye 32 rigidly secured in any approved manner to the closed end of a preferably flat, Bourdon tube 33 that is preferably curved around the moving parts of the gauge and secured at its opposite end in the recess or kerf 12 of the socket member 10, as by soldering or the like, the connection being made in such manner that the interior of the tube is open to the bore 14 extending partially through said member. A light coiled spring 34, coiled about the arbor 22 having one end secured to said arbor and its other end preferably secured around the adjacent spacing sleeve, through which the adjacent rivet 20 passes, serves to bias the pointer 33 carried by the arbor toward the zero position of a scale 35 of a dial 36 over which the pointer moves. A stop pin 37 attached to said dial, at the zero position of the scale, serves to stop the movement of the pointer under the influence of the spring 34 in a manner well understood in the art.

While one type of supporting bracket, and arrangement of moving parts in said bracket, has just been described, it should be understood that brackets of other forms and working parts differently arranged may be utilized since the present invention does not reside either in the nature of the bracket, that supports the working parts or in the working parts themselves, but in the manner in which the bracket supporting said parts and the dial is secured to the socket member of the novel form above described.

In the operation of the moving parts just described, it will be readily understood that, when fluid under pressure enters the Bourdon tube 33, the end thereof carrying the eye 32 moves outwardly rocking the sector gear 26 upon its pivotal mounting 27. Sector gear 26 actuates the gear 25 and causes the arbor 22 to be rotated about its axis carrying with it the pointer 23 which is caused to move over the scale 35 in opposition to the spring 34.

The part 21 of the bracket, in which the moving parts of the gauge are secured, is secured to socket member 10 by means of a bushing 38 having a head 39 preferably of annular form contacting with the outer face of the part 21 of the bracket, as illustrated in Figure 3. The bushing 38 is driven in the opening 17 in socket member before referred to, and may be secured in said opening in any desired manner. When in position it will be understood that the bracket, carrying the moving parts of the gauge, is secured to the socket member by said bushing, thus assembling said moving parts with respect to said socket member in an extremely simple manner.

The Bourdon tube 33, which is secured in the kerf 12 in the socket member is connected to the link 29 after the bracket supporting the moving parts is secured to the post as just stated, thus speeding the assembly of the tube, socket member and moving parts.

The dial 36 may then be assembled independently of the bracket that supports the moving parts of the gauge by passing the enlarged opening 40 over the outwardly projecting portion of the arbor 22, and by securing said dial to the bushing 38 by means of a screw 41 threaded in a tapped opening 42 in said bushing. If desired, rivets may be used in place of the screw illustrated in the drawings, or drive screws of the Kalon-Parker type may be applied as will be obvious to persons skilled in the art.

It will be observed that when the dial is secured as just described, the head 39 of the bushing 38 serves to space the body of the dial from the part 21 of the bracket so that the dial will clear any projections from said bracket, as for example those caused by the rivets 20, which may project somewhat beyond the outer surface of the bracket.

After the bracket that supports the moving parts of the gauge and the dial have been secured to the socket member, said member is applied to a casing 43 of cup-shaped formation having an opening 44 in the side thereof. The assembly is inserted in the casing by tilting the same and entering the socket member 10 in the opening 44. As the socket member passes through said opening the assembly may be completely inserted within the casing until the rear flat side of the socket member rests against the back of the casing. The assembly is held in fixed relation in the casing by means of screws 45 that pass through openings in the rear wall of the casing, and that are threaded in the openings 15 and 16 of the socket member before referred to.

It will be understood that in view of the fact that the socket member presents a flat surface of relatively large area to the back of the casing, that the assembly of the socket member, bracket for securing the moving parts of the gauge, and dial are fixedly secured within the casing upon application of the screws 45 to the socket member. The open side of the casing 43 is then closed by means of a crystal 46, disposed within a bezel 47, that is attached to the casing 43 in any approved manner as by means of a screw passing through a flange of the bezel and the side of the case.

The arrangement just described may be manufactured at low cost and assembled with great expedition in view of the flat surfaces of relatively large area presented by the socket member to the casing and to the part of the bracket secured thereagainst. Adequate support is thus presented for the parts. The dial is secured to the socket member independently of the bracket supporting the moving parts together, and use is made of the fastening means for securing the bracket to the socket member to space the dial from the bracket so that any incidental projections therefrom will not interfere with the disposition of the dial so that its face is disposed in a plane at right angles to the axis of rotation of the pointers moving thereover.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:—

1. A pressure gauge comprising a socket member, a bracket supporting the moving parts of said gauge having a part lapping one side of said member, a fastening element securing said part to said member, a dial, and means to secure said dial to said fastening element.

2. A pressure gauge comprising a socket member, a bracket supporting the moving parts of said gauge having a part lapping one side of said member, a bushing securing said part to said member, a dial, and fastening means securing said dial to said bushing independently of said bracket part.

3. A pressure gauge comprising a socket member, a bracket supporting the moving parts of said gauge having a part lapping said member, a bushing having a head formed to act as a spacer securing said bracket part to said member, a dial disposed against said spacer, and means to secure said dial to said bushing independently of said bracket part.

4. A pressure gauge comprising a socket member, a bracket for supporting the moving parts of the gauge, a dial, common means for securing said bracket to said member and for spacing said dial from said bracket member and means for securing said dial to said common means.

5. A pressure gauge comprising a socket member, a bracket for supporting the moving parts of the gauge, a dial, friction means engaging said bracket and said member for securing said bracket and said member together and including a spacing means and screw threaded means for securing said dial to said friction means.

6. A pressure gauge comprising a socket member constructed from a piece of flat stock being threaded to permit application of the member to a threaded opening, a Bourdon tube supported in a recess cut in one side of the stock, a bore through said threaded end of the socket member in communication with said tube, a bracket supporting the moving parts of the gauge above the end of said piece of stock remote from that which is threaded, said bracket having a downwardly extending part, a dial, common means for securing said bracket to said member and for spacing said dial from said bracket, means to secure said dial to said common means, a casing for the moving parts of the gauge, and means to secure said casing to the side of said socket member opposite to that to which said bracket part is attached.

MAXIMILIAN KLEIN.